(12) United States Patent
Song et al.

(10) Patent No.: US 10,140,684 B2
(45) Date of Patent: Nov. 27, 2018

(54) ELECTRONIC DEVICE AND OPERATING METHOD THEREOF

(71) Applicant: SAMSUNG ELECTRONICS CO., LTD., Suwon-si, Gyeonggi-do (KR)

(72) Inventors: Muguen Song, Suwon-si (KR); Seonggeun Park, Suwon-si (KR); Keonyoung Cho, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 50 days.

(21) Appl. No.: 15/342,400

(22) Filed: Nov. 3, 2016

(65) Prior Publication Data

US 2017/0124681 A1 May 4, 2017

(30) Foreign Application Priority Data

Nov. 3, 2015 (KR) .................. 10-2015-0153579

(51) Int. Cl.
*G06T 3/40* (2006.01)
*G09G 5/373* (2006.01)

(52) U.S. Cl.
CPC ............. *G06T 3/40* (2013.01); *G09G 5/373* (2013.01); *G09G 2330/026* (2013.01); *G09G 2330/027* (2013.01); *G09G 2340/0407* (2013.01)

(58) Field of Classification Search
CPC ..... G06T 3/40; G09G 5/373; G09G 2330/026
USPC .................. 345/629–641, 660–671
See application file for complete search history.

(56) References Cited

U.S. PATENT DOCUMENTS

| | | | | |
|---|---|---|---|---|
| 6,633,305 | B1 * | 10/2003 | Sarfeld | G06F 3/0481 |
| | | | | 345/667 |
| 9,865,193 | B2 * | 1/2018 | Lim | G09G 3/2096 |
| 2002/0030686 | A1 * | 3/2002 | Sakai | G06F 3/14 |
| | | | | 345/531 |
| 2007/0019007 | A1 | 1/2007 | Jung | |
| 2009/0066730 | A1 * | 3/2009 | Mikawa | G06T 3/40 |
| | | | | 345/661 |
| 2010/0097401 | A1 * | 4/2010 | Shiratani | G09G 5/00 |
| | | | | 345/660 |
| 2011/0134097 | A1 * | 6/2011 | Sugamata | G06F 1/3203 |
| | | | | 345/211 |
| 2012/0236040 | A1 | 9/2012 | Eom et al. | |
| 2013/0033448 | A1 * | 2/2013 | Yano | G06F 3/04883 |
| | | | | 345/173 |
| 2013/0100162 | A1 * | 4/2013 | Iseri | G09G 5/14 |
| | | | | 345/629 |
| 2014/0078181 | A1 * | 3/2014 | Harada | G09G 5/373 |
| | | | | 345/661 |
| 2014/0375694 | A1 * | 12/2014 | Ohba | G06T 3/40 |
| | | | | 345/660 |

(Continued)

FOREIGN PATENT DOCUMENTS

| | | |
|---|---|---|
| KR | 10-2007-0010706 | 1/2007 |
| KR | 10-2007-0010710 | 1/2007 |

(Continued)

*Primary Examiner* — Ryan R Yang
(74) *Attorney, Agent, or Firm* — Nixon & Vanderhye P.C.

(57) ABSTRACT

Disclosed are an electronic device and an operating method thereof. The electronic device and the operating method thereof may display an object based on a previously set magnification on a display, may update the set magnification based on a state switching of the display, and may display the object based on the updated magnification on the display.

20 Claims, 20 Drawing Sheets

(56) References Cited

U.S. PATENT DOCUMENTS

2015/0062183 A1 3/2015 Hong et al.
2016/0147296 A1* 5/2016 Yun ..................... G02B 27/017
                       345/156

FOREIGN PATENT DOCUMENTS

| KR | 10-2009-0071683 | 7/2009 |
| KR | 10-2012-0106558 | 9/2012 |
| KR | 10-2015-0024711 | 3/2015 |

\* cited by examiner

ELECTRONIC DEVICE AND OPERATING METHOD THEREOF

CROSS-REFERENCE TO RELATED APPLICATION

This application is based on and claims priority under 35 U.S.C. § 119 to Korean Application Serial No. 10-2015-0153579, which was filed in the Korean Intellectual Property Office on Nov. 3, 2015, the content of which is incorporated by reference herein in its entirety.

TECHNICAL FIELD

The present disclosure relates generally to an electronic device and an operating method thereof.

BACKGROUND

With the progress of technology, an electronic device has various functions added thereto and can perform multiple functions. The electronic device may include a display unit. Also, the electronic device can display various screens on the display unit. Recently, the display unit can be driven by using a self light-emitting phenomenon without a separate backlight unit.

However, the above-described electronic device may be problematic in that an afterimage may be generated on the display unit. This may be because respective lifetimes of light-emitting elements of the display unit are differently reduced. As a result, in the display unit, respective brightness degrees of the light-emitting elements may become different from each other. Therefore, an afterimage may be generated in response to an object located at a fixed position on the display unit.

SUMMARY

In accordance with an example aspect of the present disclosure, an operating method of an electronic device is provided. The operating method may include displaying an object based on a previously set magnification on a display; updating the set magnification based on a state switching of the display; and displaying the object based on the updated magnification on the display.

In accordance with another example aspect of the present disclosure, an electronic device is provided. The electronic device may include a display; and processor configured to be functionally connected to the display. According to various example embodiments of the present disclosure, the processor may be configured to display an object based on a previously set magnification on the display, to update the set magnification based on a state switching of the display, and to display the object based on the updated magnification on the display.

In accordance with another example aspect of the present disclosure, an electronic device is provided. The electronic device may include a display; and processor configured to be functionally connected to the display. According to various example embodiments of the present disclosure, the processor may be configured to display a background screen and an object of a first magnification on the display, and to display an object of a second magnification on the display based on a state switching of the electronic device.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
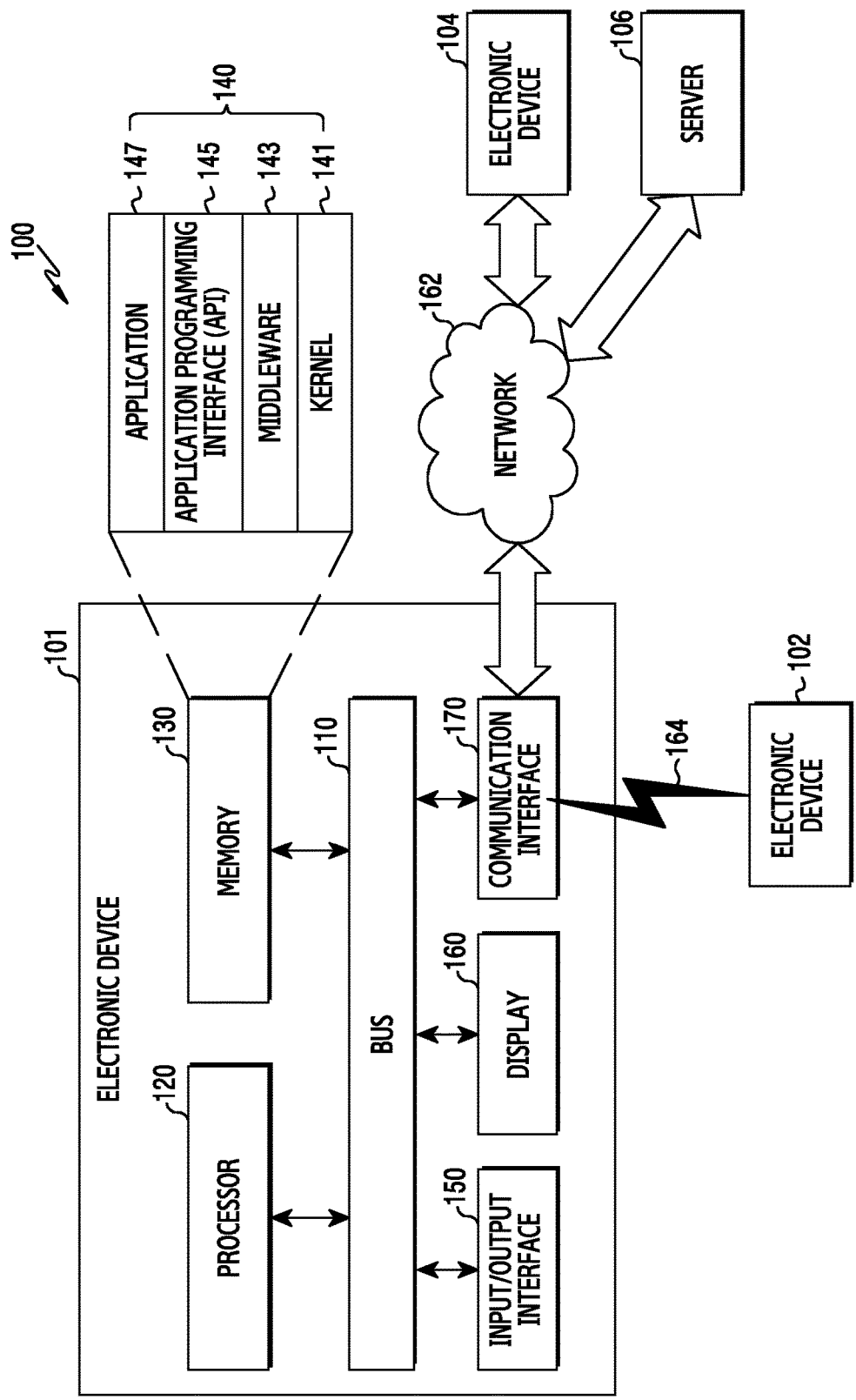
FIG. 1 is a diagram illustrating an example network environment including an electronic device according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to a situation in which the device, together with other devices or components, "is able to". For example, the phrase "processor adapted (or configured) to perform A, B, and C" may refer, for example, to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe example embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various example embodiments, will be described with reference to FIG. 1. The electronic device 101 may include a bus 110, a processor 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP), or other processing circuitry. The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface including various input/output circuitry that may transfer commands or data input from a user or another external device to the other element(s) of the electronic device 101. Furthermore, the input/output interface 150 may use various input/output circuitry to output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto.

The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may use various communication circuitry to establish communication, for example, between the electronic device 101 and an external device (e.g., a first external electronic device 102, a second external electronic device 104, or a server 106). For example, the communication interface 170 may be connected to a network 162 through various wireless or wired communication circuitry and/or methods, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include various communication circuitry, such as, for example, and without limitation, at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include various communication circuitry, for example, and without limitation, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
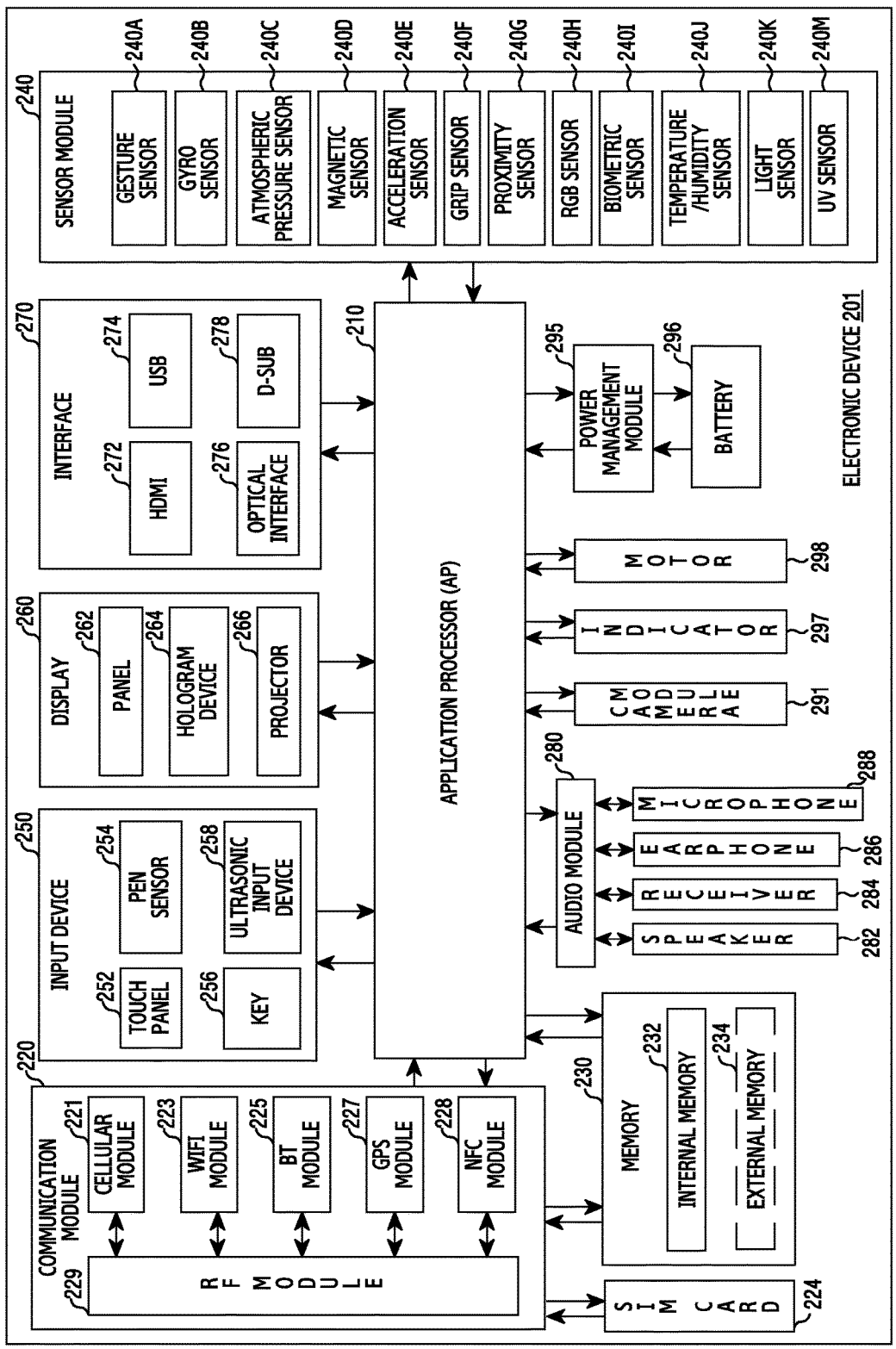
FIG. 2 is a block diagram illustrating an example electronic device according to various example embodiments of the present disclosure.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, various processing circuitry, a System on Chip (SoC), or the like. According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G a color sensor 240H (e.g., red, green, and blue (RGB) sensor), a biometric sensor (medical sensor) 240I, a temperature/humidity sensor 240J, an illuminance sensor 240K (e.g., ambient light sensor), and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
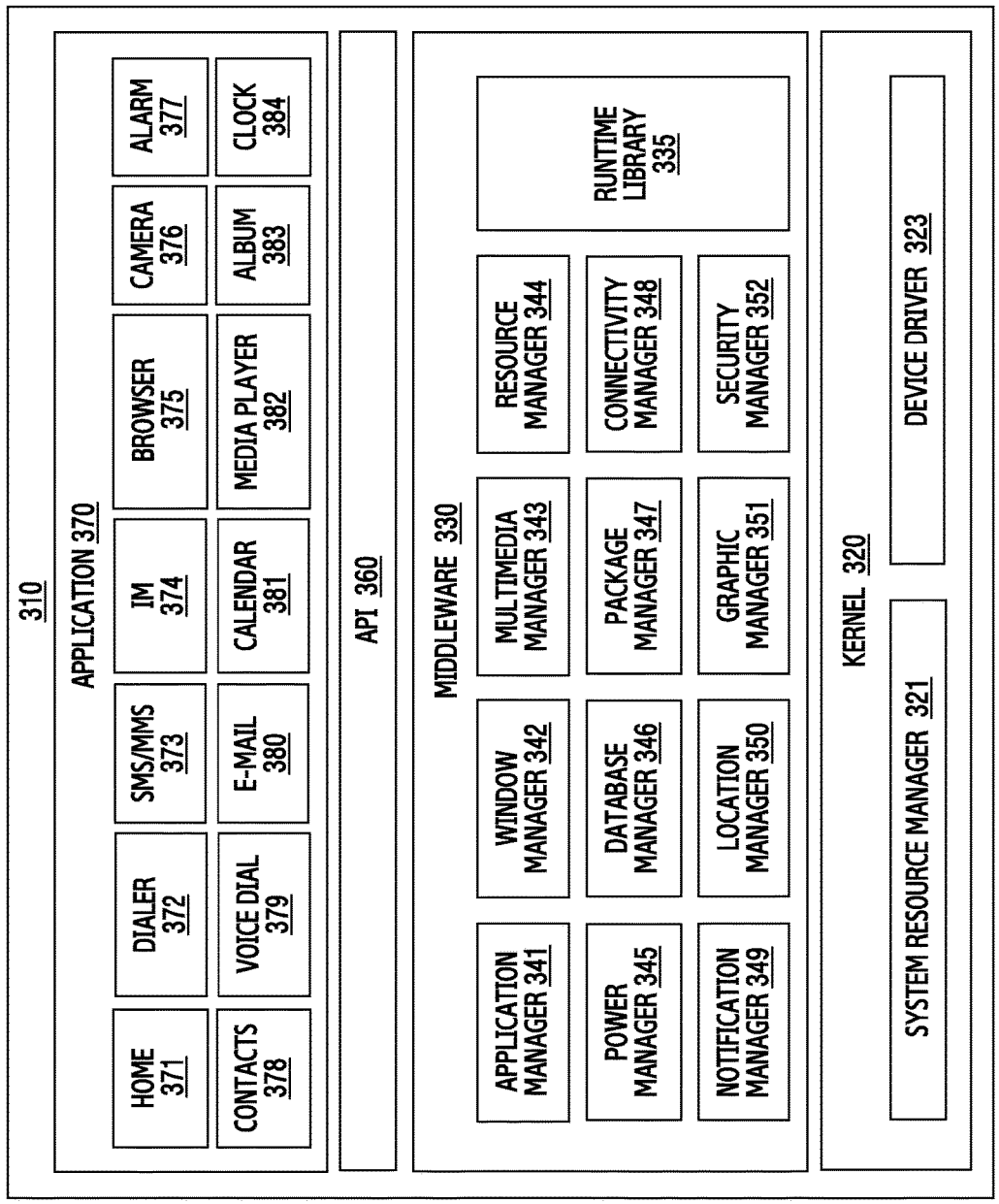
FIG. 3 is a block diagram illustrating an example program module according to various example embodiments of the present disclosure.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an e-mail 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Figure 4:
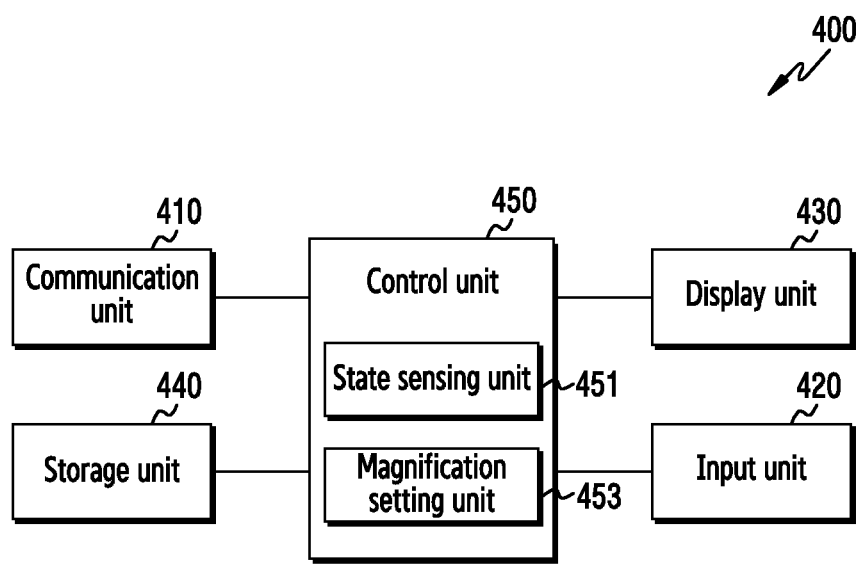
FIG. 4 is a block diagram illustrating an example configuration of an electronic device according to various example embodiments of the present disclosure.

FIG. 4 is a block diagram illustrating an example configuration of an electronic device according to various example embodiments of the present disclosure.

Referring to FIG. 4, the electronic device 400 according to various embodiments of the present disclosure may include a communication unit (e.g., including communication circuitry) 410, an input unit (e.g., including input circuitry) 420, a display unit (e.g., including a display) 430, a storage unit 440, and a control unit (e.g., including processing circuitry) 450.

The communication circuitry of the communication unit 410 enables the electronic device 400 to perform communication. In the present example, the communication unit 410 may communicate with an external device (not illustrated) in various communication schemes. For example, the communication unit 410 may use various communication circuitry to perform communication in a wireless or wired scheme. To this end, the communication unit 410 may access at least one of a mobile communication network and a data communication network. Alternatively, the communication unit 410 may perform short-range communication. Examples of the external device may include an electronic device, a base station, a server, and a satellite. Also, examples of the communication scheme may include Long-Term Evolution (LTE), Wideband Code Division Multiple Access (WCDMA), Global System for Mobile Communications (GSM), Wi-Fi, Wireless Local Area Network (WLNA), Bluetooth, and Near Field Communication (NFC).

The input unit 420 includes various input circuitry that enables the electronic device 400 to generate input data. In the present example, the input unit 420 may generate input data in response to an input of a user of the electronic device 400. Also, the input unit 420 may include at least one input means. The input unit 420 may include various input circuitry, such as, for example, and without limitation, a key pad, a dome switch, a physical button, a touch panel, a jog & shuttle, and a sensor.

The display unit 430 includes a display (e.g., a display panel) that enables the electronic device 400 to output display data. According to various embodiments of the present disclosure, the display unit 430 may be driven by using a self light-emitting phenomenon. The display unit 430 may include an Organic Light Emitting Diode (OLED) display and an Active Matrix Organic Light Emitting Diode (AMOLED) display. In the present example, the display unit 430 may be combined with the input unit 420 and may be implemented as a touch screen.

The storage unit 440 may store operation programs of the electronic device 400. According to various embodiments of the present disclosure, the storage unit 440 may store programs for controlling an object display magnification. Also, the storage unit 440 may store data generated while the programs are executed. Further, the storage unit 440 may store at least one object.

According to various embodiments of the present disclosure, the object may include at least one of an image object, an icon, and text. For example, the image object may include at least one of a status bar and a task bar. The icon may include at least one of a shortcut, a folder, and a file. The text may represent text corresponding to the image object or the icon. The icon and the text may be disposed in the image object, and may be disposed separately from the image object.

According to various embodiments of the present disclosure, the object display magnification may represent a display magnification of the object on the display unit 430. For example, the object display magnification may be Dot-Per-Inch (DPI) or Pixel-Per-Inch (PPI) which represents the size of the text or icon.

The control unit 450 may include various processing circuitry (e.g., a controller, CPU, or the like) configured to control an overall operation of the electronic device 400. To this end, the control unit 450 may be functionally connected to the elements of the electronic device 400 and may control the elements thereof. Also, the control unit 450 may receive commands or data from the elements of the electronic device 400 and may process the received commands or data. Through this configuration, the control unit 450 may perform various functions. For example, the control unit 450 may include a function processing unit for processing the functions. Also, the function processing unit may be an Application Processor (AP).

In the present example, the control unit 450 may display an object on the display unit 430 according to an object display magnification. To this end, the control unit 450 may include a state sensing unit (e.g., including state sensing circuitry) 451 and a magnification setting unit (e.g., including magnification setting circuitry) 453. The state sensing unit 451 may sense a state of the electronic device 400. For example, the state sensing unit 451 may sense an on-state and an off-state of the electronic device 400. Also, the state sensing unit 451 may sense respective states of the elements of the electronic device 400. Further, the state sensing unit 451 may sense an event for switching a state of the electronic device 400. The magnification setting unit 453 may set an object display magnification in response to the display unit 430. In addition, the magnification setting unit 453 may update the object display magnification.

According to various embodiments of the present disclosure, the control unit 450 may sense the on-state of the electronic device 400, and may detect attribute information of the display unit 430. For example, the attribute information of the display unit 430 may include at least one of the size and resolution of the display unit 430. Further, the control unit 450 may set an object display magnification on the basis of the attribute information of the display unit 430. Alternatively, the control unit 450 may further set at least one of a magnification variable range and a magnification change direction, which are defined by a minimum value and maximum value of the object display magnification, on the basis of the attribute information of the display unit 430.

According to various embodiments of the present disclosure, the control unit 450 may update the object display magnification on the basis of a state switching of the display unit 430. The state switching of the display unit 430 may represent a switching between an off-state and an on-state of the display unit 430. According to an embodiment of the present disclosure, when an event for turning off the display unit 430 is sensed, the control unit 450 may update the object display magnification, and may then turn off the display unit 430. According to another embodiment of the present disclosure, when an event for turning on the display unit 430 is sensed, the control unit 450 may update the object display magnification, and may then turn on the display unit 430.

For example, the control unit 450 may change the object display magnification by a previously set value. Also, the control unit 450 may change the object display magnification within a magnification variable range. At this time, the control unit 450 may determine whether it is possible to change the object display magnification in a magnification change direction. Further, when it is possible to change the object display magnification in the magnification change direction, the control unit 450 may change the object display magnification in the magnification change direction. In contrast, when it is impossible to change the object display magnification in the magnification change direction, the control unit 450 may update the magnification change direction so as to have an inverse direction, and may then change the object display magnification in the updated magnification change direction.

The electronic device 400 according to various embodiments of the present disclosure may include the display unit 430; and the control unit 450 configured to be functionally connected to the display unit 430.

According to various embodiments of the present disclosure, the control unit 450 may display an object according to a previously set magnification on the display unit 430, may update the set magnification based on a state switching of the display unit 430, and may display the object according to the updated magnification on the display unit 430.

According to various embodiments of the present disclosure, the state switching of the display unit 430 may represent a switching between an off-state and an on-state of the display unit 430.

According to various embodiments of the present disclosure, the control unit 450 may sense an event for turning off the display unit 430, may update the set magnification, and may turn off the display unit 430.

According to various embodiments of the present disclosure, the control unit 450 may sense an event for turning on the display unit 430, may update the set magnification, and may turn on the display unit 430.

According to various embodiments of the present disclosure, the control unit 450 may update the set magnification by changing the set magnification by a previously set value.

According to various embodiments of the present disclosure, the control unit 450 may change the set magnification within a range defined by a previously set minimum value and a previously set maximum value.

According to various embodiments of the present disclosure, the control unit 450 may determine whether the set magnification is capable of being changed in a previously set direction, and may change the set magnification in the set direction when the set magnification is capable of being changed in the set direction, or may change the set magnification in a direction inverse to the set direction when the set magnification is not capable of being changed in the set direction.

According to various embodiments of the present disclosure, the control unit 450 may sense an on-state of the electronic device 400, and may set the magnification based on attribute information.

According to various embodiments of the present disclosure, the attribute information may include at least one of a size and a resolution of the display unit 430.

According to various embodiments of the present disclosure, the control unit 450 may set at least one of a direction and a range for changing the magnification, based on the attribute information.

According to various embodiments of the present disclosure, the control unit 450 may display a background screen and an object of a first magnification on the display unit 430, and may display an object of a second magnification on the display unit 430 based on a state switching of the electronic device 400.

Figure 5:
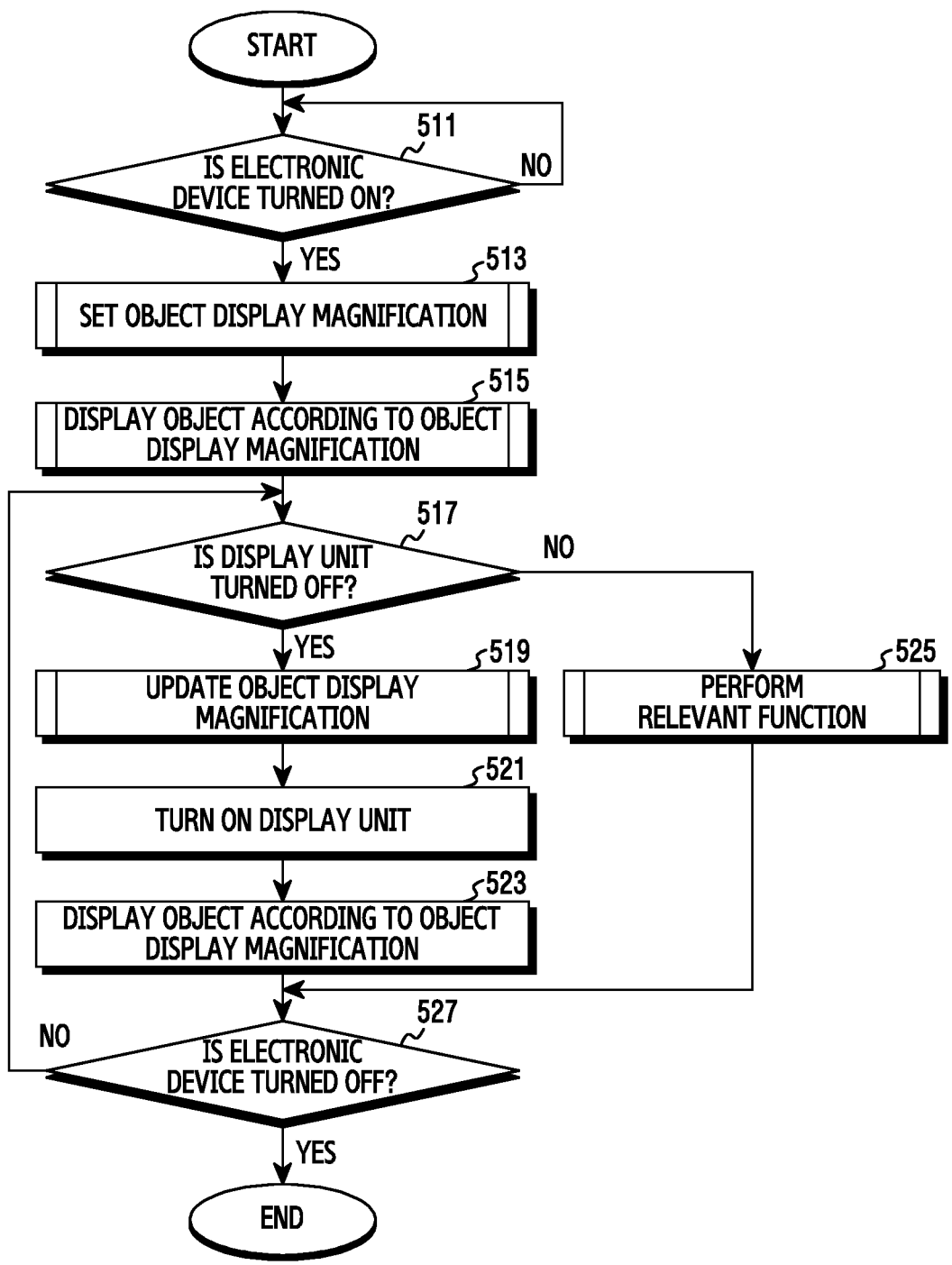
FIG. 5 is a flowchart illustrating an example method of operating an electronic device according to various example embodiments of the present disclosure.

FIG. 5 is a flowchart illustrating an example method of operating an electronic device according to various example embodiments of the present disclosure. Also, FIGS. 13A, 13B, 13C, and 13D are diagrams illustrating an example method of operating an electronic device according to various example embodiments of the present disclosure. According to an embodiment of the present disclosure, as illustrated in FIGS. 13A, 13B, 13C, and 13D, the electronic device may be a smart phone. Also, FIGS. 14A, 14B, 14C, and 14D are diagrams illustrating an example method of operating an electronic device according to various example embodiments of the present disclosure. According to another embodiment of the present disclosure, as illustrated in FIGS. 14A, 14B, 14C, and 14D, the electronic device may be a Personal Computer (PC) or a tablet PC.

Referring to FIG. 5, the method of operating the electronic device 400 according to various embodiments of the present disclosure may start from the sensing of an on-state of the electronic device 400 by the control unit 450 in operation 511. For example, the input unit 420 may include a power key. In this case, when the power key is selected, the input unit 420 may generate an event for turning on the electronic device 400. Then, the control unit 450 may sense the event for turning on the electronic device 400 and may be activated. Through this configuration, the electronic device 400 may be turned on. Further, the control unit 450 may turn on at least one of the elements of the electronic device 400. That is, the control unit 450 may supply power to at least one of the elements of the electronic device 400.

Next, in operation 513, the control unit 450 may set an object display magnification. At this time, the control unit 450 may set the object display magnification in response to the display unit 430. Specifically, the control unit 450 may set the object display magnification on the basis of attribute information of the display unit 430. For example, the control unit 450 may determine that the object display magnification has a preset value. An operation of the control unit 450 for setting the object display magnification will be described below with reference to FIG. 6.

Figure 6:
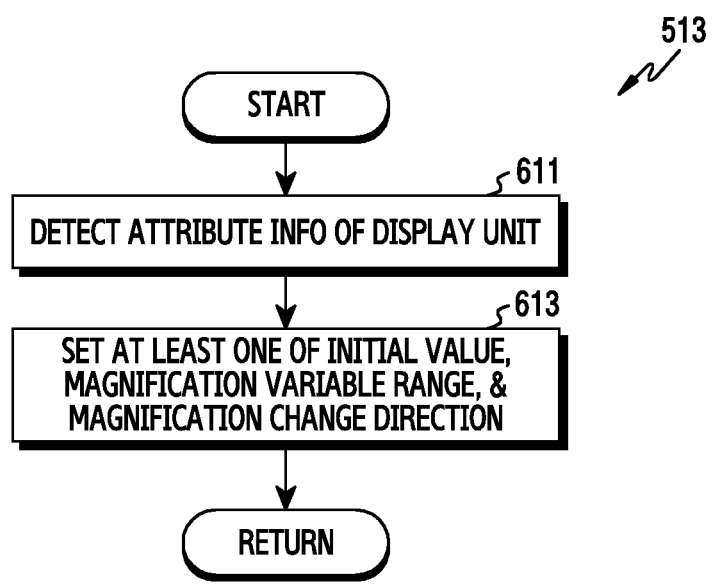
FIG. 6 is a flowchart illustrating an example object display magnification setting operation illustrated in FIG. 5.

FIG. 6 is a flowchart illustrating an example object display magnification setting operation illustrated in FIG. 5.

Referring to FIG. 6, in operation 611, the control unit 450 may detect the attribute information of the display unit 430. For example, the attribute information of the display unit 430 may include at least one of the size and resolution of the display unit 430. Also, the attribute information of the display unit 430 may be stored in the display unit 430. Alternatively, the attribute information of the display unit 430 may be stored in the storage unit 440. Further, the attribute information of the display unit 430 may be changed by an operation of the user of the electronic device 400.

Next, in operation 613, the control unit 450 may set an initial value of the object display magnification on the basis of the attribute information of the display unit 430. To this end, the storage unit 440 may map the attribute information of the display unit 430 to the initial value of the object display magnification, and may store the attribute information of the display unit 430 mapped to the initial value of the object display magnification. Through this configuration, the control unit 450 may determine the initial value of the object display magnification by using the attribute information of the display unit 430. For example, the initial value of the object display magnification may be equal to 250%. Thereafter, the control unit 450 may return to FIG. 5.

Then, in operation 613, the control unit 450 may further set at least one of a magnification variable range and a magnification change direction of the object display magnification on the basis of the attribute information of the display unit 430. For example, the storage unit 440 may map the attribute information of the display unit 430 to a minimum value and a maximum value of the object display magnification, and may store the attribute information of the display unit 430 mapped to the minimum value and the maximum value of the object display magnification. Through this configuration, the control unit 450 may determine the minimum value and the maximum value of the object display magnification by using the attribute information of the display unit 430. Also, the magnification variable range of the object display magnification may be defined to be from the minimum value to the maximum value inclusive. In addition, the storage unit 440 may map the attribute information of the display unit 430 to the magnification change direction of the object display magnification, and may store the attribute information of the display unit 430 mapped to the magnification change direction of the object display magnification. Through this configuration, the control unit 450 may determine the magnification change direction of the object display magnification by using the attribute information of the display unit 430. For example, the magnification change direction of the object display magnification may include a reduction direction for reducing the object display magnification towards the minimum value and an increase direction for increasing the object display magnification towards the maximum value. Thereafter, the control unit 450 may return to FIG. 5.

Figure 13A:
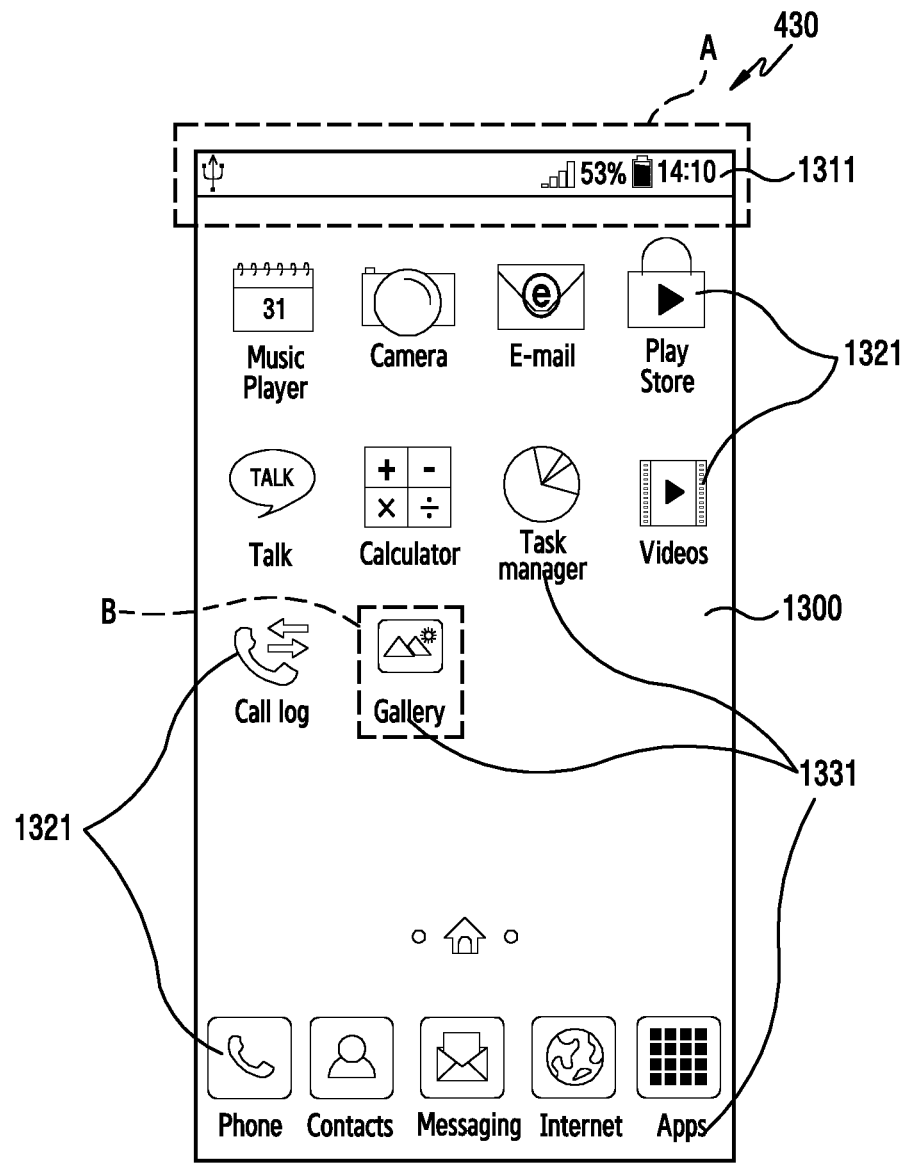
FIGS. 13A, 13B, 13C, and 13D are diagrams illustrating an example method of operating an electronic device according to various embodiments of the present disclosure.
Figure 14A:
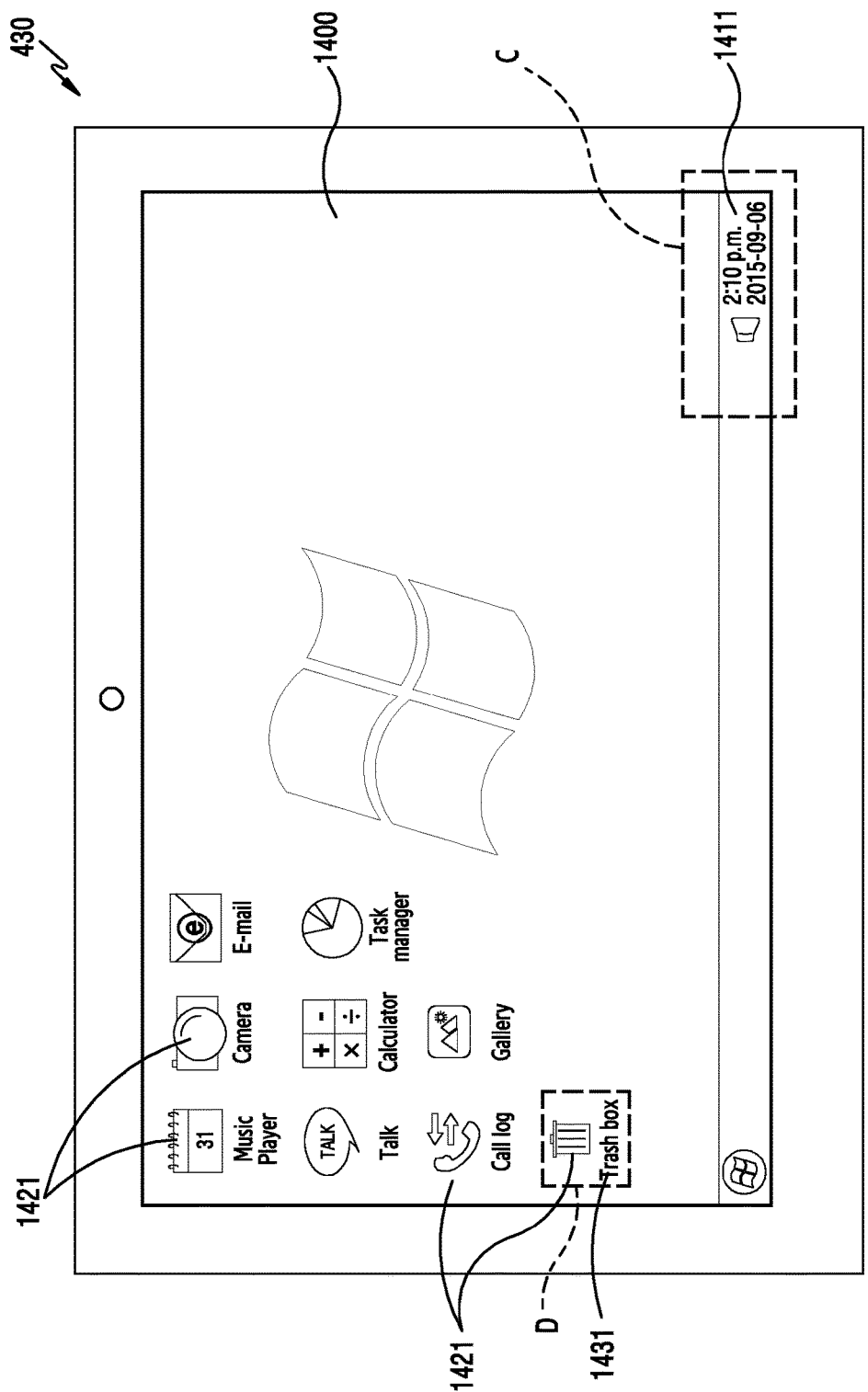
FIGS. 14A, 14B, 14C, and 14D are diagrams illustrating an example method of operating an electronic device according to various example embodiments of the present disclosure.

Next, in operation 515, the control unit 450 may display an object according to the object display magnification. According to an embodiment of the present disclosure, as illustrated in FIG. 13A, the control unit 450 may display an image object 1311, an icon 1321, and text 1331 on a background screen 1300 according to the object display magnification. According to another embodiment of the present disclosure, as illustrated in FIG. 14A, the control unit 450 may display an image object 1411, an icon 1421, and text 1431 on a background screen 1400 according to the object display magnification. For example, the control unit 450 may display the object at the object display magnification having a preset value. An operation of the control unit 450 for displaying the object will be described below with reference to FIG. 7.

Figure 7:
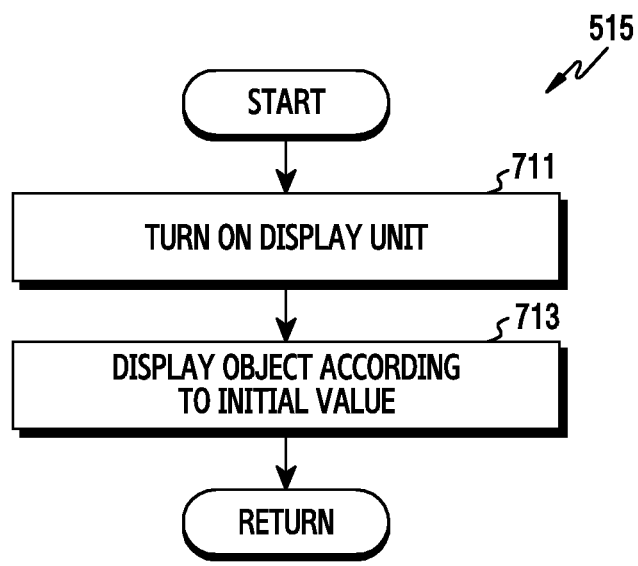
FIG. 7 is a flowchart illustrating an example operation of displaying an object according to an object display magnification illustrated in FIG. 5.

FIG. 7 is a flowchart illustrating an example operation of displaying an object according to an object display magnification illustrated in FIG. 5.

Referring to FIG. 7, in operation 711, the control unit 450 may turn on the display unit 430. At this time, the control unit 450 may supply the display unit 430 with power. Then, in operation 713, the control unit 450 may display an object at an object display magnification having an initial value. For example, the control unit 450 may display the object at the object display magnification of 250%. Thereafter, the control unit 450 may return to FIG. 5.

Next, when an event for turning off the display unit 430 occurs, in operation 517, the control unit 450 may sense the occurrence of the event. For example, the input unit 420 may include a power key. In this case, when the power key is selected, the input unit 420 may generate an event for turning off the display unit 430. Alternatively, an event for turning off the display unit 430 may occur as set in the storage unit 440. For example, when a request of the user or a separate operation of the control unit 450 is not sensed during a predetermined time period after a time point arrives which is set in the storage unit 440, the event for turning off the display unit 430 may occur. Through this configuration, the control unit 450 may sense the event for turning off the display unit 430.

Then, in operation 519, the control unit 450 may update the object display magnification. Specifically, the control unit 450 may update the object display magnification on the basis of a state switching of the display unit 430. At this time, the control unit 450 may update the object display magnification in response to either of the event for turning off the display unit 430 and an event for turning on the display unit 430. Also, the control unit 450 may change the object display magnification by a preset value. An operation of the control unit 450 for updating the object display magnification will be described below with reference to FIGS. 8, 9, 10, and 11.

Figure 8:
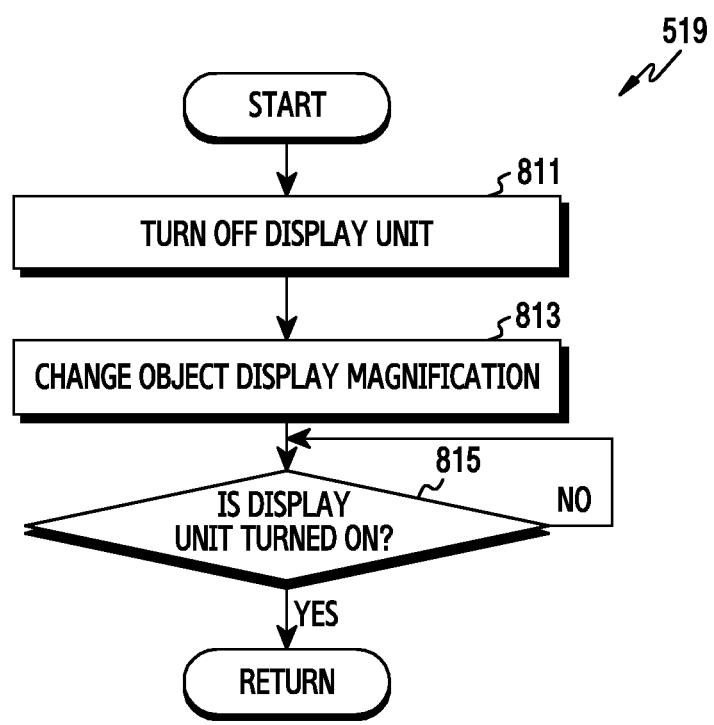
FIG. 8 is a flowchart illustrating an example object display magnification updating operation illustrated in FIG. 5.

FIG. 8 is a flowchart illustrating an example object display magnification updating operation illustrated in FIG. 5.

Referring to FIG. 8, in operation 811, the control unit 450 may turn off the display unit 430. Specifically, the control unit 450 may turn off the display unit 430 in response to an event for turning off the display unit 430. To this end, the control unit 450 may cut off the supply of power to the display unit 430.

Then, in operation 813, the control unit 450 may change the object display magnification. At this time, the control unit 450 may change the object display magnification by a preset value. For example, the control unit 450 may reduce or increase the object display magnification by 1%. Specifically, the control unit 450 may reduce the object display magnification from 250% to 249%. Alternatively, the control unit 450 may increase the object display magnification from 250% to 251%.

Next, when an event for turning on the display unit 430 occurs, in operation 815, the control unit 450 may sense the occurrence of the event. For example, the input unit 420 may include a power key. In this case, when the power key is selected, the input unit 420 may generate an event for turning on the display unit 430. Through this configuration, the control unit 450 may sense the event for turning on the display unit 430. Then, the control unit 450 may return to FIG. 5.

Figure 9:
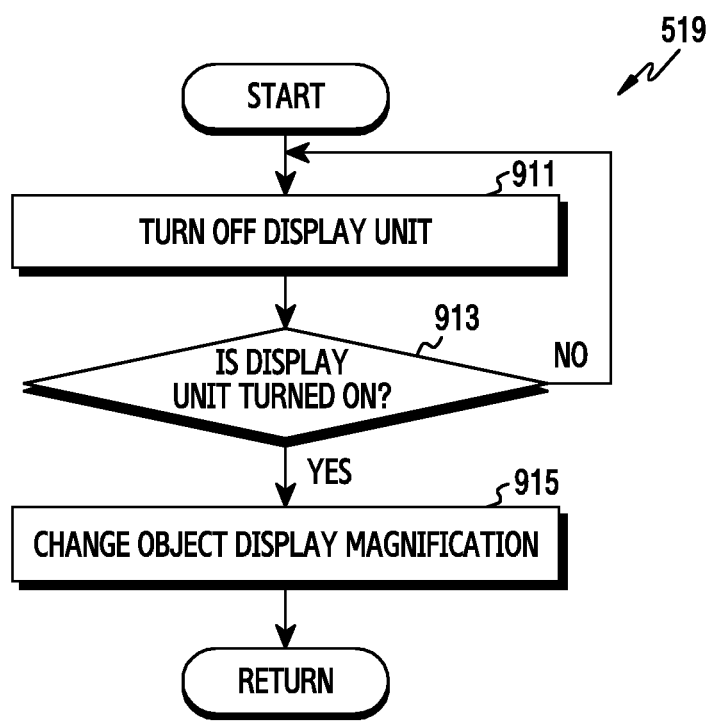
FIG. 9 is a flowchart illustrating an example object display magnification updating operation illustrated in FIG. 5.

FIG. 9 is a flowchart illustrating an example object display magnification updating operation illustrated in FIG. 5.

Referring to FIG. 9, in operation 911, the control unit 450 may turn off the display unit 430. Specifically, the control unit 450 may turn off the display unit 430 in response to an event for turning off the display unit 430. At this time, the control unit 450 may cut off the supply of power to the display unit 430. Thereafter, when an event for turning on the display unit 430 occurs, in operation 913, the control unit 450 may sense the occurrence of the event. For example, the input unit 420 may include a power key. In this case, when the power key is selected, the input unit 420 may generate an event for turning on the display unit 430. Through this configuration, the control unit 450 may sense the event for turning on the display unit 430.

Then, in operation 915, the control unit 450 may change an object display magnification. Specifically, the control unit 450 may change the object display magnification in response to the event for turning on the display unit 430. At this time, the control unit 450 may change the object display magnification by a preset value. For example, the control unit 450 may reduce or increase the object display magnification by 1%. Specifically, the control unit 450 may reduce the object display magnification from 250% to 249%. Alternatively, the control unit 450 may increase the object display magnification from 250% to 251%. Thereafter, the control unit 450 may return to FIG. 5.

Figure 10:
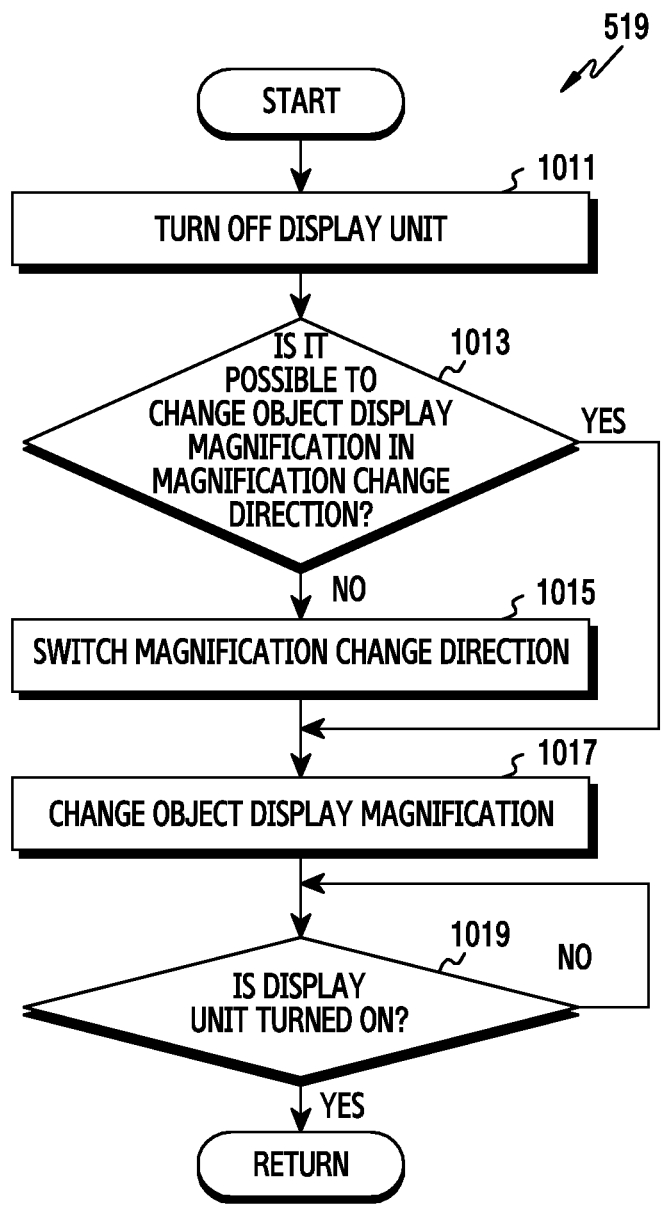
FIG. 10 is a flowchart illustrating an example object display magnification updating operation illustrated in FIG. 5.

FIG. 10 is a flowchart illustrating an example object display magnification updating operation illustrated in FIG. 5.

Referring to FIG. 10, in operation 1011, the control unit 450 may turn off the display unit 430. Specifically, the control unit 450 may turn off the display unit 430 in response to an event for turning off the display unit 430. At this time, the control unit 450 may cut off the supply of power to the display unit 430.

Next, in operation 1013, the control unit 450 may determine whether it is possible to change an object display magnification in a magnification change direction. Specifically, the control unit 450 may determine whether it is possible to change the object display magnification in the magnification change direction in response to the event for turning off the display unit 430. At this time, the control unit 450 may compare the object display magnification with a magnification variable range and the magnification change direction. For example, when the magnification change direction is a reduction direction, the control unit 450 may determine whether the object display magnification has reached a minimum value of the magnification variable range. Alternatively, when the magnification change direction is an increase direction, the control unit 450 may determine whether the object display magnification has reached a maximum value of the magnification variable range.

Next, when it is determined in operation 1013 that it is impossible to change the object display magnification in the magnification change direction, in operation 1015, the control unit 450 may switch the magnification change direction of the object display magnification. Specifically, the control unit 450 may update the magnification change direction of the object display magnification to an inverse direction. For example, when it is determined that the object display magnification has reached the minimum value of the magnification variable range, the control unit 450 may change the magnification change direction from the reduction direction to the increase direction. Alternatively, when it is determined that the object display magnification has reached the maximum value of the magnification variable range, the control unit 450 may change the magnification change direction from the increase direction to the reduction direction.

Then, in operation 1017, the control unit 450 may change the object display magnification. Specifically, the control unit 450 may change the object display magnification in response to the event for turning off the display unit 430. At this time, the control unit 450 may change the object display magnification by a preset value. For example, when the magnification change direction is the reduction direction, the control unit 450 may reduce the object display magnification by 1%. Specifically, the control unit 450 may reduce the object display magnification from 250% to 249%. Alternatively, when the magnification change direction is the increase direction, the control unit 450 may increase the object display magnification by 1%. Specifically, the control unit 450 may increase the object display magnification from 250% to 251%.

In contrast, when it is determined in operation 1013 that it is possible to change the object display magnification in the magnification change direction, in operation 1017, the control unit 450 may change the object display magnification. Specifically, the control unit 450 may change the object display magnification in response to the event for turning off the display unit 430. At this time, the control unit 450 may change the object display magnification by a preset value. For example, when the magnification change direction is the reduction direction, the control unit 450 may reduce the object display magnification by 1%. Specifically, the control unit 450 may reduce the object display magnification from 250% to 249%. Alternatively, when the magnification change direction is the increase direction, the control unit 450 may increase the object display magnification by 1%. Specifically, the control unit 450 may increase the object display magnification from 250% to 251%.

Next, when an event for turning on the display unit 430 occurs, in operation 1019, the control unit 450 may sense the occurrence of the event. For example, the input unit 420 may include a power key. In this case, when the power key is selected, the input unit 420 may generate an event for turning on the display unit 430. Through this configuration, the control unit 450 may sense the event for turning on the display unit 430. Then, the control unit 450 may return to FIG. 5.

Figure 11:
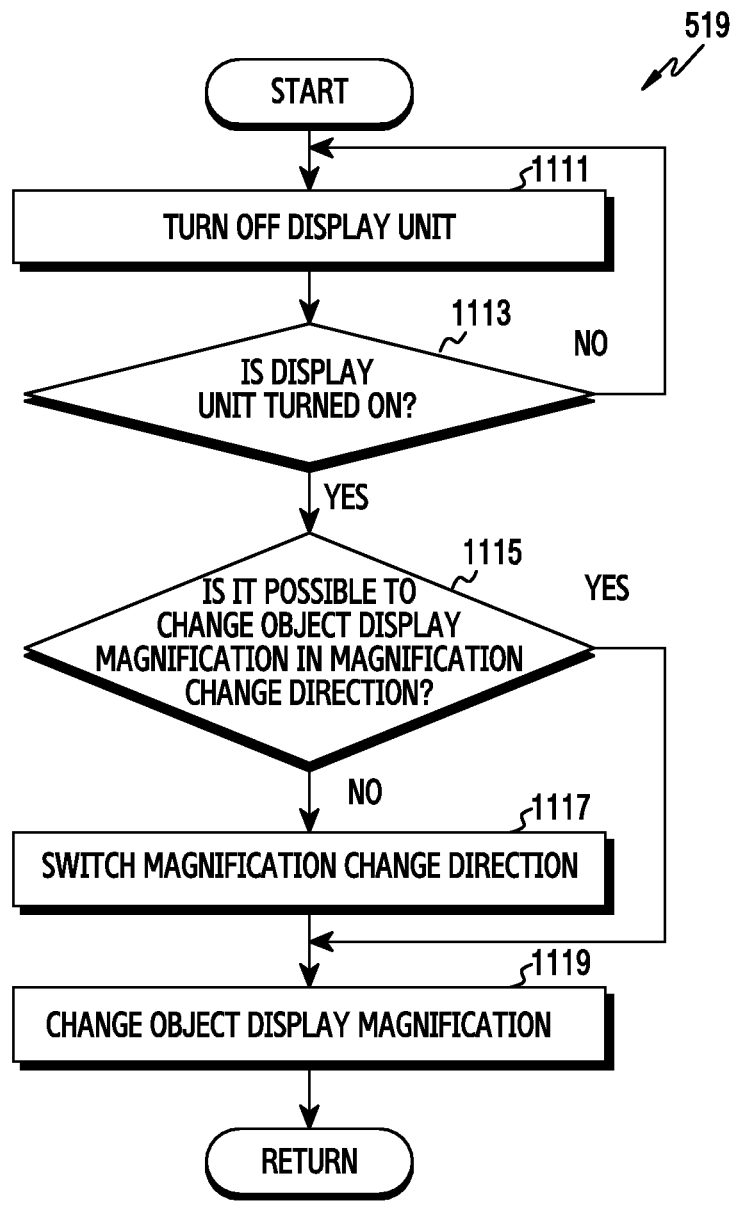
FIG. 11 is a flowchart illustrating an example object display magnification updating operation illustrated in FIG. 5.

FIG. 11 is a flowchart illustrating an example object display magnification updating operation illustrated in FIG. 5.

Referring to FIG. 11, in operation 1111, the control unit 450 may turn off the display unit 430. Specifically, the control unit 450 may turn off the display unit 430 in response to an event for turning off the display unit 430. At this time, the control unit 450 may cut off the supply of power to the display unit 430. Thereafter, when an event for turning on the display unit 430 occurs, in operation 1113, the control unit 450 may sense the occurrence of the event. For example, the input unit 420 may include a power key. In this case, when the power key is selected, the input unit 420 may generate an event for turning on the display unit 430. Through this configuration, the control unit 450 may sense the event for turning on the display unit 430.

Then, in operation 1115, the control unit 450 may determine whether it is possible to change an object display magnification in a magnification change direction. Specifically, the control unit 450 may determine whether it is possible to change the object display magnification in the magnification change direction in response to the event for turning on the display unit 430. At this time, the control unit 450 may compare the object display magnification with a magnification variable range and the magnification change direction. For example, when the magnification change direction is a reduction direction, the control unit 450 may determine whether the object display magnification has reached a minimum value of the magnification variable range. Alternatively, when the magnification change direction is an increase direction, the control unit 450 may determine whether the object display magnification has reached a maximum value of the magnification variable range.

Next, when it is determined in operation 1115 that it is impossible to change the object display magnification in the magnification change direction, in operation 1117, the control unit 450 may switch the magnification change direction of the object display magnification. Specifically, the control unit 450 may update the magnification change direction of the object display magnification to an inverse direction. For example, when it is determined that the object display magnification has reached the minimum value of the magnification variable range, the control unit 450 may change the magnification change direction from the reduction direction to the increase direction. Alternatively, when it is determined that the object display magnification has reached the maximum value of the magnification variable range, the control unit 450 may change the magnification change direction from the increase direction to the reduction direction.

Then, in operation 1119, the control unit 450 may change the object display magnification. Specifically, the control unit 450 may change the object display magnification in response to the event for turning on the display unit 430. At this time, the control unit 450 may change the object display magnification by a preset value. For example, when the magnification change direction is the reduction direction, the control unit 450 may reduce the object display magnification by 1%. Specifically, the control unit 450 may reduce the object display magnification from 250% to 249%. Alternatively, when the magnification change direction is the increase direction, the control unit 450 may increase the object display magnification by 1%. Specifically, the control unit 450 may increase the object display magnification from 250% to 251%.

In contrast, when it is determined in operation 1115 that it is possible to change the object display magnification in the magnification change direction, in operation 1117, the control unit 450 may change the object display magnification. Specifically, the control unit 450 may change the object display magnification in response to the event for turning on the display unit 430. At this time, the control unit 450 may change the object display magnification by a preset value. For example, when the magnification change direction is the reduction direction, the control unit 450 may reduce the object display magnification by 1%. Specifically, the control unit 450 may reduce the object display magnification from 250% to 249%. Alternatively, when the magnification change direction is the increase direction, the control unit 450 may increase the object display magnification by 1%. Specifically, the control unit 450 may increase the object display magnification from 250% to 251%. Thereafter, the control unit 450 may return to FIG. 5.

Figure 13B:
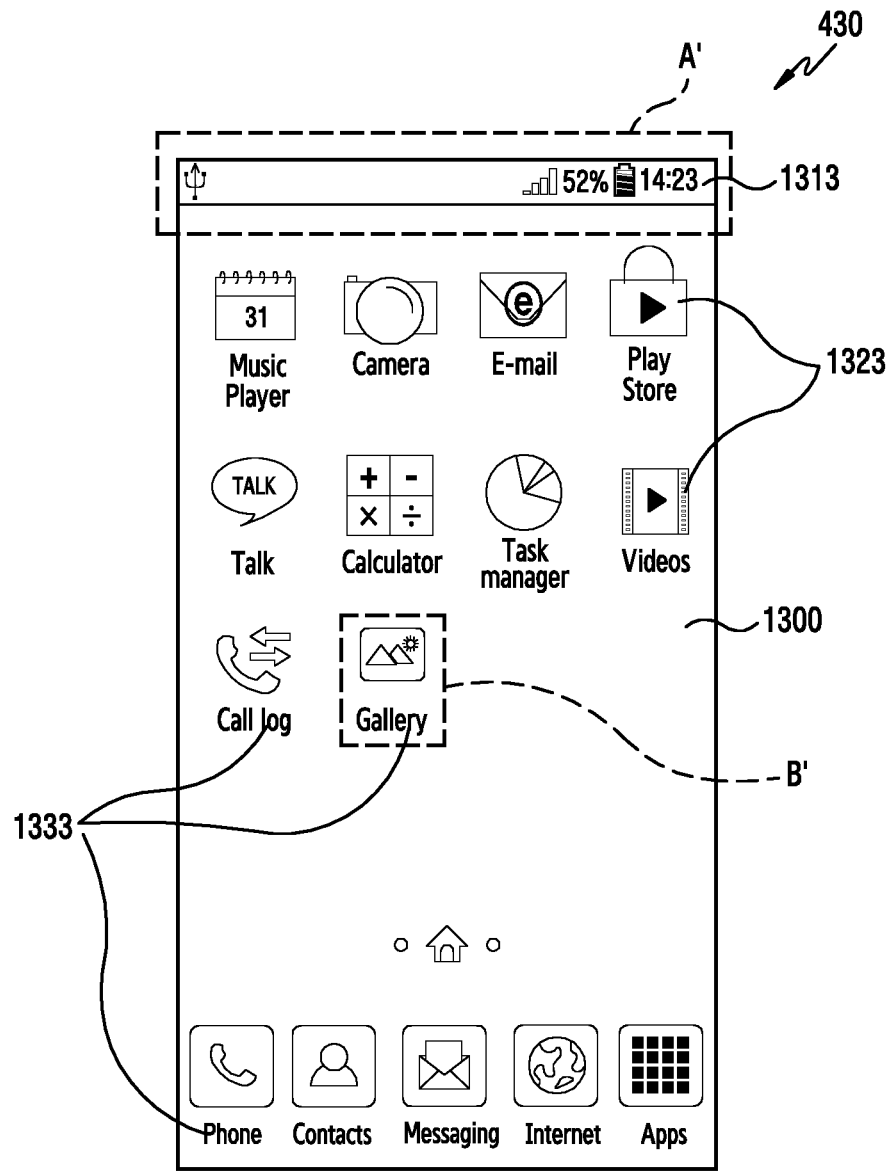
Figure 14B:
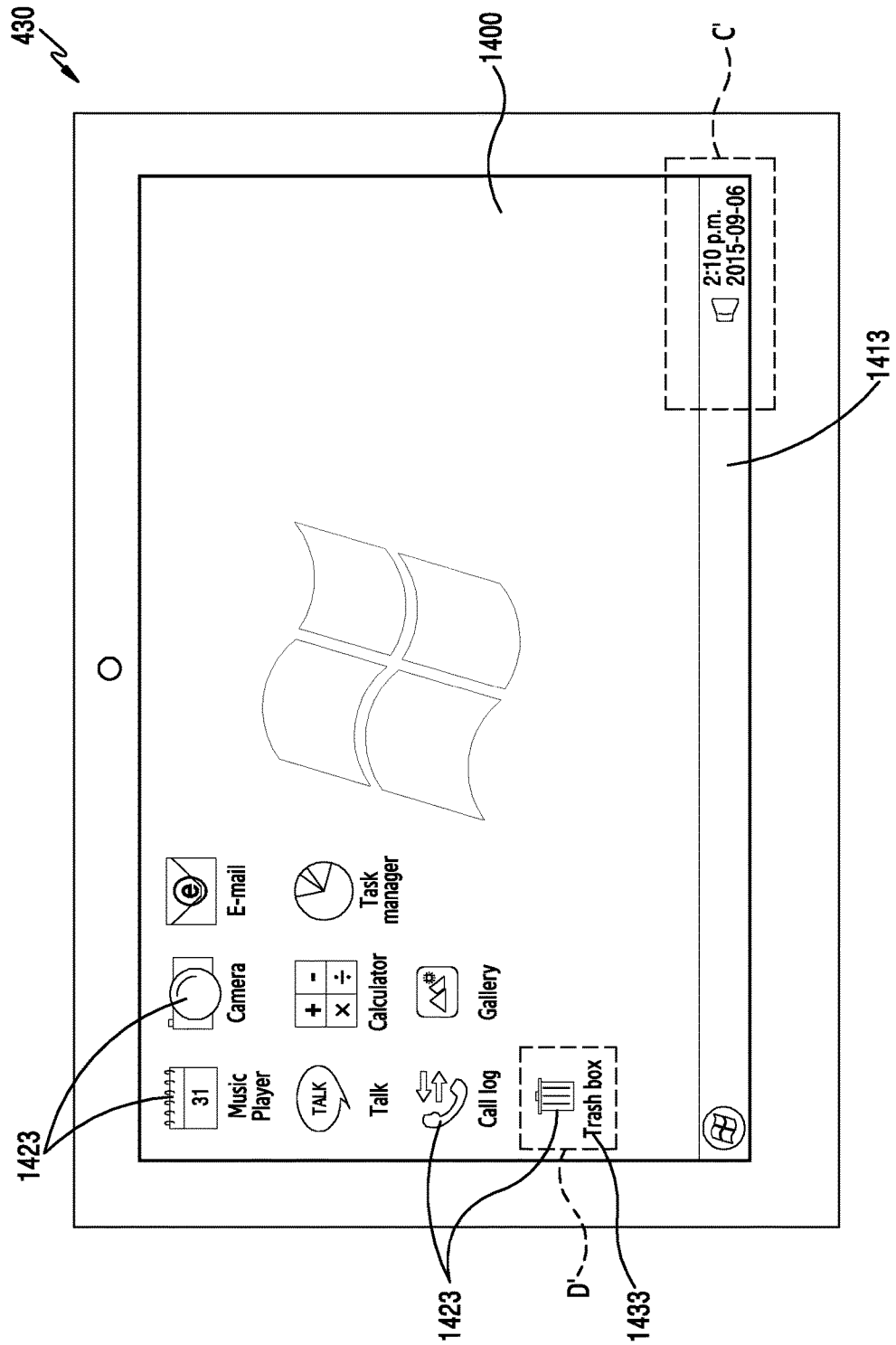

Then, in operation 521, the control unit 450 may turn on the display unit 430. At this time, the control unit 450 may supply the display unit 430 with power. Next, in operation 523, the control unit 450 may display an object according to the object display magnification. According to an embodiment of the present disclosure, as illustrated in FIG. 13B, the control unit 450 may display an image object 1313, an icon 1323, and text 1333 on the background screen 1300 according to the object display magnification. Through this configuration, at least one of positions and sizes of the image object 1313, the icon 1323, and the text 1333 may be changed on the background screen 1300. According to another embodiment of the present disclosure, as illustrated in FIG. 14B, the control unit 450 may display an image object 1413, an icon 1423, and text 1433 on the background screen 1400 according to the object display magnification. Through this configuration, at least one of positions and sizes of the image object 1413, the icon 1423, and the text 1433 may be changed on the background screen 1400.

Figure 13C:
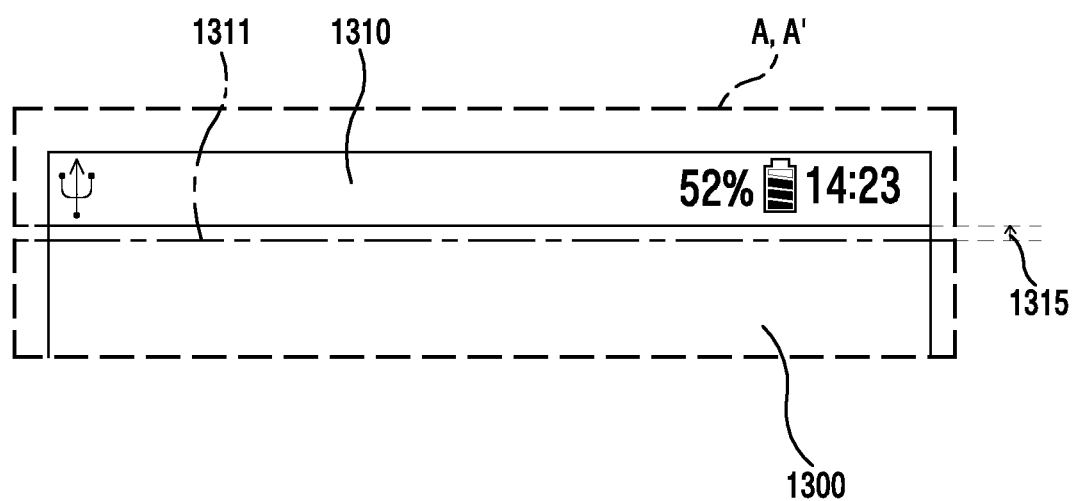
Figure 13D:
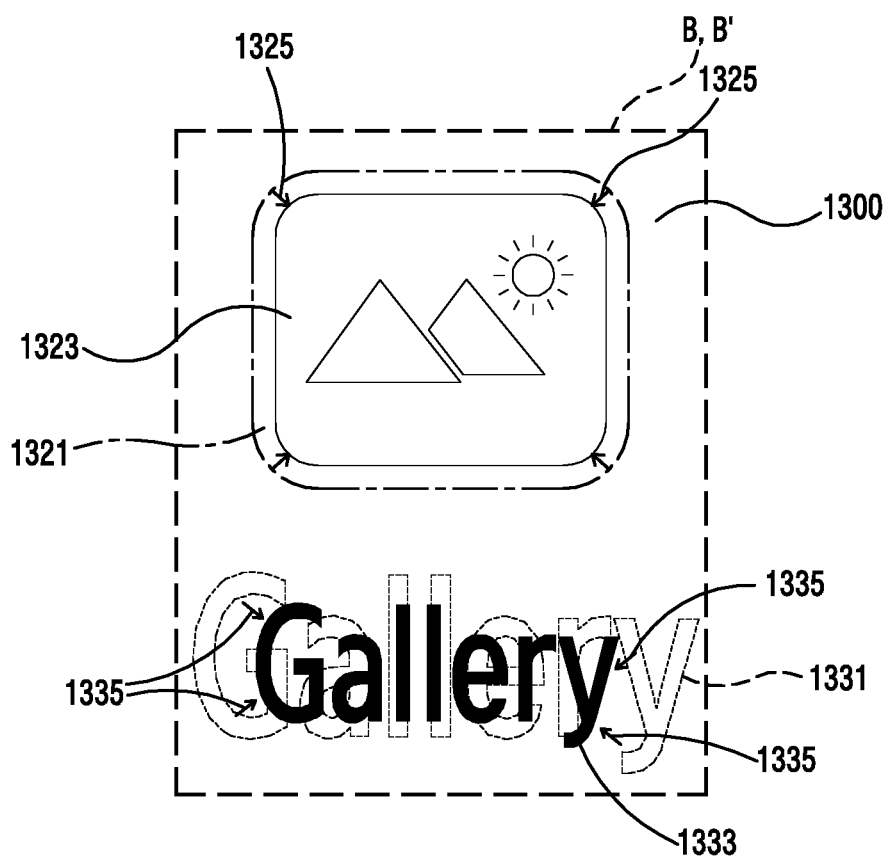
Figure 14C:
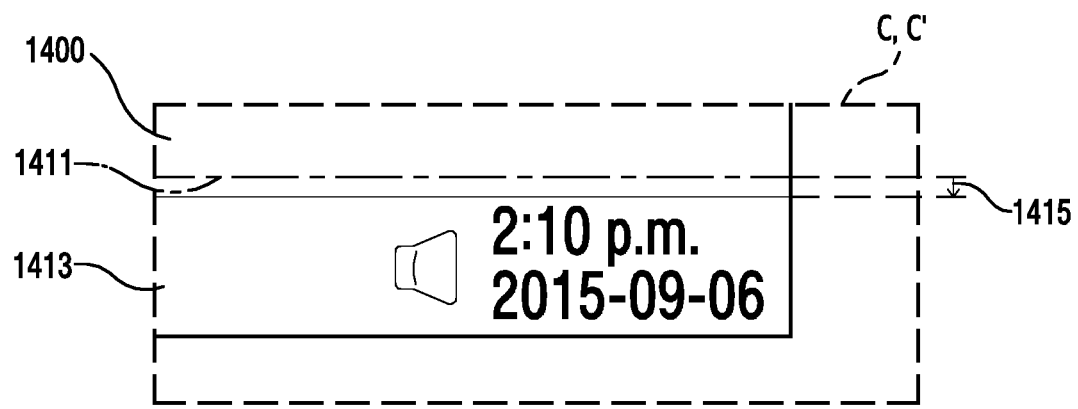
Figure 14D:
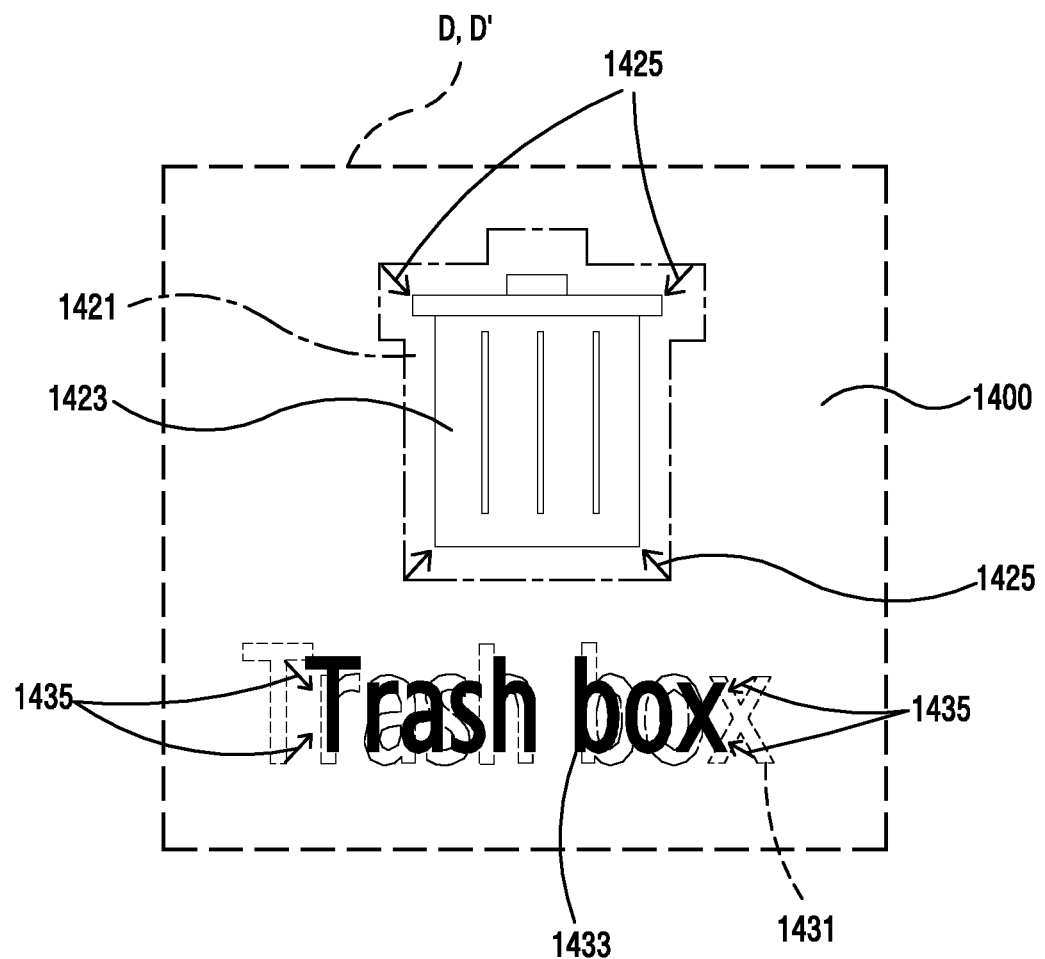

According to an embodiment of the present disclosure, the image object 1313 may be reduced in a change direction 1315 on the background screen 1300 as illustrated in FIG. 13C. For example, the change direction 1315 of the image object 1313 may be a vertical direction. Also, as illustrated in FIG. 13D, the icon 1323 and the text 1333 may be reduced in respective change directions 1325 and 1335 on the background screen 1300. For example, the respective change directions 1325 and 1335 of the icon 1323 and the text 1333 may be a horizontal direction and a vertical direction, respectively. Alternatively, although not illustrated, the image object 1313, the icon 1323, and the text 1333 may be enlarged on the background screen 1300. According to another embodiment of the present disclosure, the image object 1413 may be reduced in a change direction 1415 on the background screen 1400 as illustrated in FIG. 14C. For example, the change direction 1415 of the image object 1413 may be a vertical direction. Also, as illustrated in FIG. 14D, the icon 1423, and the text 1433 may be reduced in respective change directions 1425 and 1435 on the background screen 1400. For example, the respective change directions 1425 and 1435 of the icon 1423, and the text 1433 may be a horizontal direction and a vertical direction, respectively. Alternatively, although not illustrated, the image object 1413, the icon 1423, and the text 1433 may be enlarged on the background screen 1400.

Meanwhile, when the event for turning off the display unit 430 has not been sensed in operation 517, in operation 525, the control unit 450 may perform a relevant function. Specifically, the control unit 450 may perform the relevant function without updating the object display magnification. For example, the control unit 450 may reset the object display magnification in response to a request of the user of the electronic device 400. Specifically, the control unit 450 may reset the object display magnification on the basis of a change of attribute information of the display unit 430. An operation of the control unit 450 for performing the relevant function will be described below with reference to FIG. 12.

Figure 12:
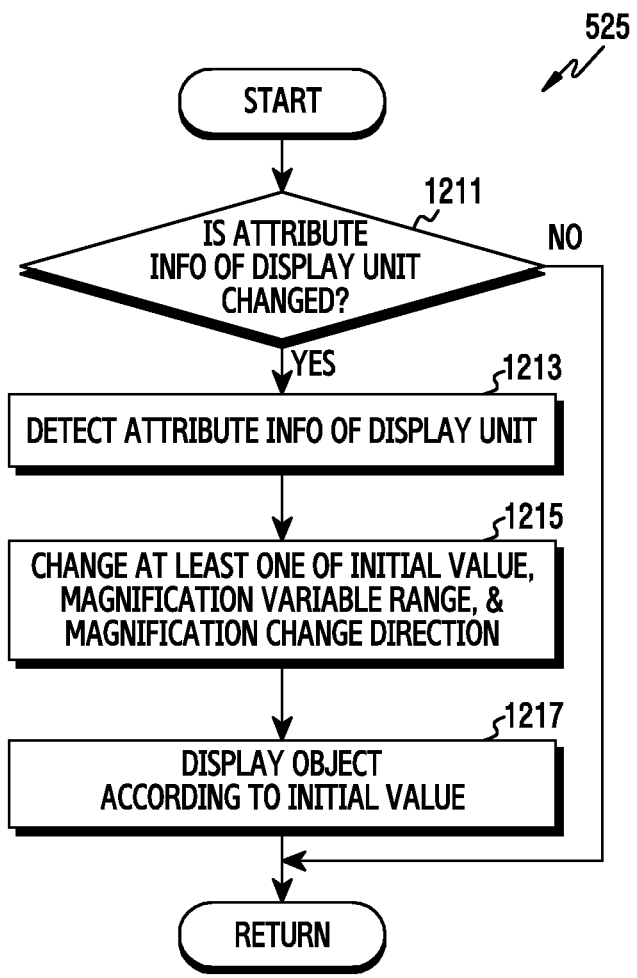
FIG. 12 is a flowchart illustrating an example relevant function execution operation illustrated in FIG. 5.

FIG. 12 is a flowchart illustrating a example relevant function execution operation illustrated in FIG. 5.

Referring to FIG. 12, in operation 1211, the control unit 450 may sense a change of attribute information of the display unit 430. For example, the attribute information of the display unit 430 may be changed by an operation of the user of the electronic device 400. Through this configuration, the control unit 450 may sense a change of the attribute information of the display unit 430. Then, in operation 1213, the control unit 450 may detect the attribute information of the display unit 430. At this time, the attribute information of the display unit 430 may exist in the display unit 430 in a state of being changed. Alternatively, the attribute information of the display unit 430 may exist in the storage unit 440 in a state of being changed.

Then, in operation 1215, the control unit 450 may change an initial value of an object display magnification on the basis of the attribute information of the display unit 430. To this end, the storage unit 440 may map the attribute information of the display unit 430 to the initial value of the object display magnification, and may store the attribute information of the display unit 430 mapped to the initial value of the object display magnification. Through this configuration, the control unit 450 may determine the initial value of the object display magnification by using the attribute information of the display unit 430. For example, the initial value of the object display magnification may be equal to 249%.

Then, in operation 1215, the control unit 450 may further change at least one of a magnification variable range and a magnification change direction of the object display magnification on the basis of the attribute information of the display unit 430. For example, the storage unit 440 may map the attribute information of the display unit 430 to a minimum value and a maximum value of the object display magnification, and may store the attribute information of the display unit 430 mapped to the minimum value and the maximum value of the object display magnification. Through this configuration, the control unit 450 may determine the minimum value and the maximum value of the object display magnification by using the attribute information of the display unit 430. Also, the magnification variable range of the object display magnification may be defined to be from the minimum value to the maximum value inclusive. In addition, the storage unit 440 may map the attribute information of the display unit 430 to the magnification change direction of the object display magnification, and may store the attribute information of the display unit 430 mapped to the magnification change direction of the object display magnification. Through this configuration, the control unit 450 may determine the magnification change direction of the object display magnification by using the attribute information of the display unit 430. For example, the magnification change direction of the object display magnification may include a reduction direction for reducing the object display magnification towards the minimum value and an increase direction for increasing the object display magnification towards the maximum value.

Then, in operation 1217, the control unit 450 may display an object at the object display magnification having the initial value. For example, the control unit 450 may display the object at the object display magnification of 249%. Thereafter, the control unit 450 may return to FIG. 5.

Lastly, when the electronic device 400 is turned off, in operation 527, the control unit 450 may sense an off-state of the electronic device 400. For example, when the power key is selected, the input unit 420 may generate an event for turning off the electronic device 400. Then, the control unit 450 may sense the event for turning off the electronic device 400, and may cut off the supply of power to the elements of the electronic device 400. Also, the control unit 450 may be deactivated. Through this configuration, the electronic device 400 may be turned off. Accordingly, the operating method of the electronic device 400 may end.

In contrast, when the off-state of the electronic device 400 has not been sensed in operation 527, the control unit 450 may repeatedly perform at least one of operations 517 to 527. At this time, until the off-state of the electronic device 400 is sensed in operation 527, the control unit 450 may repeatedly perform at least one of operations 517 to 527.

According to another embodiment of the present disclosure, the control unit 450 may change the object display magnification on the basis of a state switching of the electronic device 400. Specifically, when the electronic device 400 switches between a low-power state and a normal state, the control unit 450 may change the object display magnification. At this time, the control unit 450 may update the object display magnification in response to at least one of an event for switching the electronic device 400 from the low-power state to the normal state and an event for switching the electronic device 400 from the normal state to the low-power state.

According to various embodiments of the present disclosure, an operating method of the electronic device 400 may include displaying an object according to a previously set magnification on the display unit 430; updating the set magnification based on a state switching of the display unit 430; and displaying the object according to the updated magnification on the display unit 430.

According to various embodiments of the present disclosure, the state switching of the display unit 430 may represent a switching between an off-state and an on-state of the display unit 430.

According to various embodiments of the present disclosure, the updating of the set magnification may include: sensing an event for turning off the display unit 430; updating the set magnification; and turning off the display unit 430.

According to various embodiments of the present disclosure, the updating of the set magnification may include: turning off the display unit 430; sensing an event for turning on the display unit 430; updating the set magnification; and turning on the display unit 430.

According to various embodiments of the present disclosure, the updating of the set magnification may include changing the set magnification by a previously set value.

According to various embodiments of the present disclosure, the updating of the set magnification may include changing the set magnification within a range defined by a previously set minimum value and a previously set maximum value.

According to various embodiments of the present disclosure, the updating of the set magnification may include one of: determining whether the set magnification is capable of being changed in a previously set direction; and changing the set magnification in the set direction when the set magnification is capable of being changed in the set direction; or changing the set magnification in a direction inverse to the set direction when the set magnification is not capable of being changed in the set direction.

According to various embodiments of the present disclosure, the operating method of the electronic device 400 may further include: sensing an on-state of the electronic device 400; and setting the magnification based on attribute information.

According to various embodiments of the present disclosure, the attribute information may include at least one of a size and a resolution of the display unit 430.

According to various embodiments of the present disclosure, the operating method of the electronic device 400 may further include setting at least one of a direction and a range for changing the magnification, based on the attribute information.

According to various embodiments of the present disclosure, the operating method of the electronic device 400 may include: displaying a background screen and an object of a first magnification on the display unit 430; and displaying an object of a second magnification on the display unit 430 based on a state switching of the electronic device 400.

According to various embodiments of the present disclosure, the electronic device 400 can suppress the generation of an afterimage on the display unit 430. Specifically, the electronic device 400 may change an object display magnification and thereby may change at least one of the position and size of an object on the display unit 430. In other words, the position and size of an object may be flexible on the display unit 430. Through this configuration, the generation of an afterimage can be suppressed on the display unit 430. Also, the degradation of light-emitting elements can be delayed. At this time, the electronic device 400 can change an object display magnification on the basis of a state switching of the display unit 430 or that of the electronic device 400. Therefore, even when the electronic device 400 changes the object display magnification, it can be prevented that the user does not recognize the change of the object display magnification and thus, inconvenience is caused to the user.

Meanwhile, example embodiments of the present disclosure illustrated and described herein and the drawings correspond to examples presented in order to easily explain technical contents of the present disclosure, and to aid in comprehension of the present disclosure, but are not intended to limit the scope of the present disclosure. That is, it will be apparent to those skilled in the art to which the present disclosure belongs that different modifications can be achieved based on the technical spirit of the present disclosure.

What is claimed is:

1. A method of operating an electronic device comprising a display, the method comprising:
    displaying an object with a magnification on the display in an active state;
    switching, in response to detecting a designated event while displaying the object with the first magnification, a state of the display to an inactive state;
    restoring, in response to detecting another designated event while the display is in the inactive state, the state of the display to the active state; and
    in response to restoring the state of the display, displaying the object with another magnification in the active state.

2. The method as claimed in claim 1, wherein the another magnification is determined by the electronic device, independent of user input.

3. The method as claimed in claim 1, further comprising:
    immediately before or after switching the state of the display to the inactive state, changing the magnification to the another magnification.

4. The method as claimed in claim 1, further comprising:
    immediately before or after restoring the state of the display to the active state, changing the magnification to the another magnification.

5. The method as claimed in claim 1, further comprising changing the magnification to the another magnification based on a previously set parameter.

6. The method as claimed in claim 5, wherein the changing of the magnification comprises changing the magnification within a range defined by a previously set minimum value and a previously set maximum value.

7. The method as claimed in claim 6, wherein the changing of the magnification comprises:
    determining whether the set magnification is capable of being changed in a previously set direction;
    changing the magnification in the set direction when the magnification is capable of being changed in the set direction; and
    changing the magnification in a direction inverse to the set direction when the magnification is not capable of being changed in the set direction.

8. The method as claimed in claim 1, further comprising: setting the magnification based on attribute information.

9. The method as claimed in claim 8, wherein the attribute information comprises at least one of a size and a resolution of the display.

10. The method as claimed in claim 8, further comprising setting at least one of a direction and a range for changing the magnification, based on the attribute information.

11. An electronic device comprising:
    a display; and
    a processor configured to be functionally connected to the display,
    wherein the processor is configured to:
        display an object with a magnification on the display in an active state,
        switch, in response to detecting a designated event while displaying the object with the magnification, a state of the display to an inactive state;
        restore, in response to detecting another designated event while the display is in the inactive state, the state of the display to the active state; and
        in response to restoring the state of the display, display the object with another magnification on the display in the active state.

12. The electronic device as claimed in claim 11, wherein the another magnification is determined by the electronic device, independent of user input.

13. The electronic device as claimed in claim 11, wherein the processor is configured to change the magnification to the another magnification, immediately before or after switching the state of the display to the inactive state.

14. The electronic device as claimed in claim 11, wherein the processor is configured to change the magnification to the another magnification, immediately before or after switching the state of the display to the active state.

15. The electronic device as claimed in claim 11, wherein the processor is configured to change the magnification to the another magnification based on a previously set parameter.

16. The electronic device as claimed in claim 15, wherein the processor is configured to change the magnification within a range defined by a previously set minimum value and a previously set maximum value.

17. The electronic device as claimed in claim 16, wherein the processor is configured to determine whether the magnification is capable of being changed in a previously set direction, to change the magnification in the set direction when the magnification is capable of being changed in the set direction, and to change the magnification in a direction inverse to the set direction when the magnification is not capable of being changed in the set direction.

18. The electronic device as claimed in claim 11, wherein the processor is configured to set the magnification based on attribute information.

19. The electronic device as claimed in claim 18, wherein the attribute information comprises at least one of a size and a resolution of the display.

20. An electronic device comprising:
    a display; and
    a processor configured to be functionally connected to the display,
    wherein the processor is configured to display an object with a first magnification in a background screen on the display, and to display the object with a second magnification changed from the first magnification in the background screen on the display, based on a state switching of the display between an inactive state and an active state.

* * * * *